(No Model.)
B. GALLAGHER.
MACHINE FOR SHEARING METAL.
No. 249,749. Patented Nov. 22, 1881.
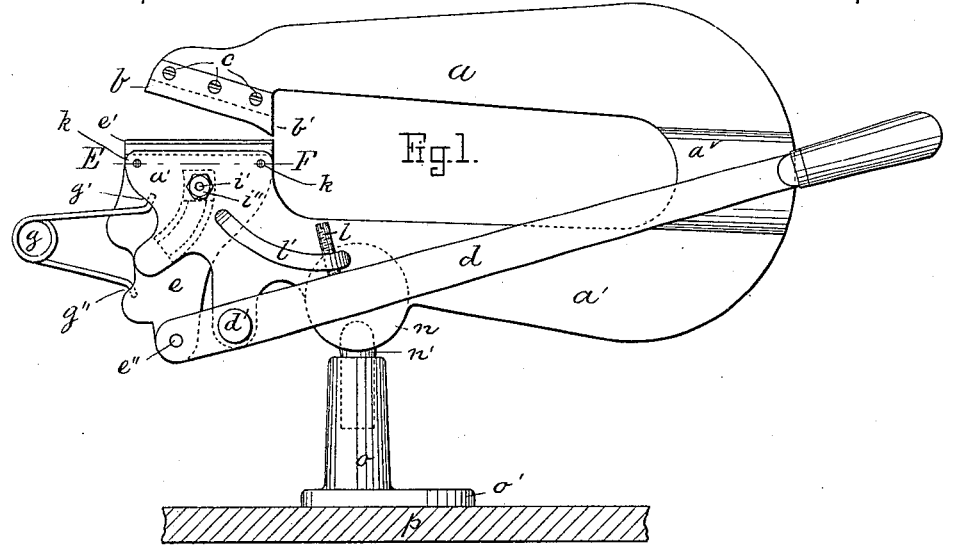
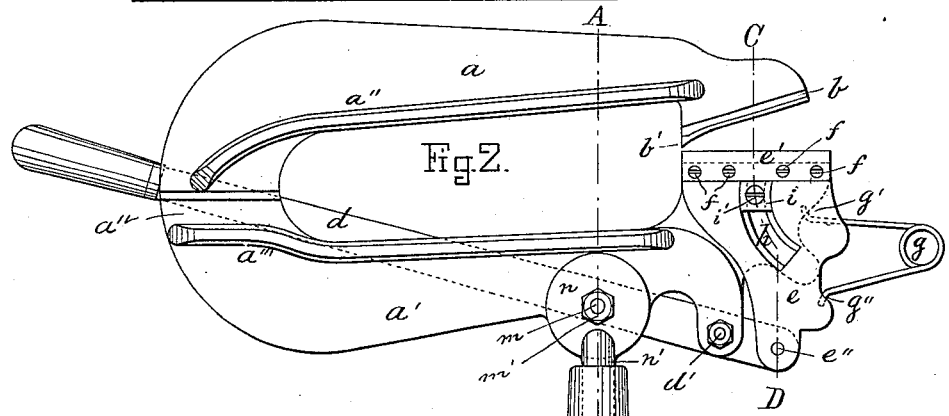
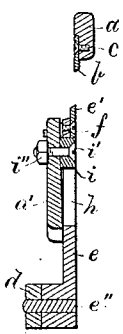
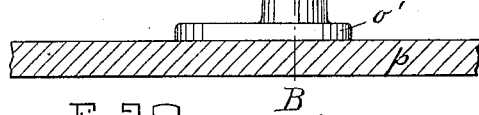
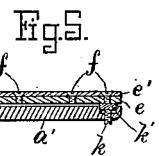
Witnesses.
Henry Chadbourn.
F. Allen.
Inventor.
Bernard Gallagher
by Alban Andrew his atty.

UNITED STATES PATENT OFFICE.

BERNARD GALLAGHER, OF ST. JOHN, NEW BRUNSWICK, CANADA.

MACHINE FOR SHEARING METAL.

SPECIFICATION forming part of Letters Patent No. 249,749, dated November 22, 1881.

Application filed March 3, 1881. (No model.)

*To all whom it may concern:*

Be it known that I, BERNARD GALLAGHER, a subject of Great Britain, residing at St. John, in the province of New Brunswick and Dominion of Canada, have invented certain new and useful Improvements in Shearing-Machines; and I do hereby declare that the same are fully described in the following specification and illustrated in the accompanying drawings.

This invention relates to improvements in shears, and it is especially adapted for the purpose of cutting boot or shoe patterns of metal or pasteboard, although it is equally useful for any other purpose; and it is carried out as follows, reference being had to the accompanying drawings, in which—

Figure 1 represents a front elevation of my improved shears. Fig. 2 represents a rear elevation. Fig. 3 represents a vertical section on the line A B. (Shown in Fig. 2.) Fig. 4 represents a cross-section on the line C D, (shown in Fig. 2;) and Fig. 5 represents a horizontal section on the line E F. (Shown in Fig. 1.)

Similar letters refer to similar parts wherever they occur on the different parts of the drawings.

$a$ $a'$ represent the goose-neck, of which $a$ is the upper and $a'$ the lower part, as shown. To the extreme forward end of the frame $a$ is secured the stationary cutter $b$, which is provided with a downward-projecting lip, $b'$, to enable the shears to be used for cutting very small curves. The cutter $b$ is secured to the frame $a$ by means of screws $c$ $c$ $c$, as shown.

$d$ is the lever for operating the lower movable cutter, $e'$, that is secured to the movable plate $e$ by means of screws $f$ $f$ $f$, as shown in Fig. 2. The lever $d$ is made to swing on the stationary fulcrum-pin $d'$, secured to the frame $a'$, and its forward end is jointed to the lower part of the movable plate $e$ by means of a pin, $e''$, projecting in a corresponding hole in said end of the lever $d$, as shown.

$g$ is a spring, having its upper end, $g'$, resting in a recess in the forward end of the frame $a'$, and having its lower end, $g''$, resting in a similar recess on the movable plate $e$, for the purpose of automatically lowering the movable cutter $e'$ to the positions shown in Figs. 1 and 2 when the hand-pressure on the lever $d$ is removed. Through the movable plate $e$ is made a curved slot, $h$, which is preferably made tapering—that is, widest at the rear of said plate and narrowest at its face—in which curved slot is located the guide block or piece $i$, which is held in its place in relation to the frame $a'$ by means of the screw-bolt $i'$ and check-nut $i'''$ in such a manner that said guide-block $i$ may be free to oscillate slightly on its supporting-screw $i'$ during the up-and-down motion of the plate $e$. By the arrangement of the guide-piece $i$ and curved slot $h$ in the movable plate $e$ a peculiar motion is imparted by the lever $d$ to the lower cutter, $e'$—namely, during the first part of the stroke a vertical motion—to enable the lip or point $b'$ on the stationary upper cutter, $b$, to be started on the exact spot on the plate that is to be cut, and during the remainder of the stroke a combined vertical and backward motion toward the operator, by which the operation of the shears is very much facilitated.

$k$ $k$ are regulating-screws passing through the forward end of the frame $a'$ from its front, which act on washers $k'$ $k'$ interposed between the frame $a'$ and the movable plate $e$, by which means the latter and its cutter $e'$ can be laterally adjusted in their proper positions relative to the stationary upper cutter, $b$ $b'$, as shown in Figs. 1 and 5. Recesses are made on the rear of the frame $a'$ for the reception and support of the washers $k'$ $k'$, as shown in Fig. 5.

$l$ is a regulating-screw passing through a screw-threaded projection, $l'$, on the frame $a'$, which screw serves as an adjustable stop against the lever $d$ to limit the downward stroke of the movable cutter $e'$. On the rear of the frame $a$ $a'$ are made strengthening-ribs $a''$ $a'''$, as shown in Fig. 2, which are disconnected at the rear, where a horizontal groove or recess, $a^{iv}$, is made, so as to enable the shears to be used in a practical manner for the purpose of stripping up long pieces of sheet metal or other materials, during which operation the rear end of the lower rib, $a'''$, serves as a support for one part of the sheet or strip that is being cut. $a^5$ is a strengthening-projection on the front of the frame $a$ $a'$ and opposite to the groove $a^{iv}$, so as to compensate for the rear disunion of the ribs $a''$ and $a'''$ and the groove $a^{iv}$, as shown in Figs. 1 and 3. Through the lower frame part, $a'$, passes a screw, $m$, which also passes through the circular plate or disk $n$, the lower end of which projects downward as a cylinder, $n'$, which is inserted and is supported in a correspondingly-bored-out socket, $o$, as shown in Fig. 3. By this arrangement it will be seen that the shears may be swung around the vertical axis of the cylinder $n'$, as well as tipped around the horizontal axis of the screw-bolt $m$, and thus a universal adjustment of the shear-frame is obtained, so as to locate it and its lever in any desired position for the convenience of the operator.

When adjusted, the shear-frame is secured to the disk $n$ by means of the nut $m'$ and the screw $m$, shown in Fig. 3. $o'$ is a plate or foot on the socket $o$, which is secured by suitable screws to the table, bench, or support $p$. (Shown in Figs. 1 and 2.)

Having thus fully described the nature, construction, and operation of my invention, I wish to secure by Letters Patent, and claim—

1. The herein-described improved shears, consisting of the frame $a\ a'$, stationary cutter $b\ b'$, movable plate $e$, with its curved slot $h$, guide-block $i$, fastening $i'\ i''$, and cutter $e'$, spring $g$, and lever $d$, constructed and arranged as and for the purpose set forth.

2. In combination with the movable plate $e$ and its cutter $e'$, the lever $d$, frame $a'$, with its screw-threaded projection $l'$ and adjustable screw-threaded stop $l$, as and for the purpose set forth.

3. In a shearing-machine, the combination of the regulating-screws $k\ k$ and washers $k'\ k'$ with the frame $a\ a'$, stationary cutter $b\ b'$, and movable cutter $e'$, with its movable plate $e$, as and for the purpose set forth and described.

In testimony whereof I have affixed my signature in presence of two witnesses.

BERNARD GALLAGHER.

Witnesses:
ALBAN ANDRÉN,
HENRY CHADBOURN.